Feb. 3, 1970 S. I. FINKEL ET AL 3,493,874
STATISTICAL DECISION SYSTEMS
Filed Jan. 5, 1966 3 Sheets-Sheet 1

INVENTORS
SEYMOUR I. FINKEL
WARREN M. JANES
RAGNAR N. NILSEN
BY
Brumbaugh, Free,
Graves & Donohue
their ATTORNEYS United States Patent Office 3,493,874
Patented Feb. 3, 1970

3,493,874
STATISTICAL DECISION SYSTEMS
Seymour I. Finkel, East Orange, Warren M. Janes, Dover, and Ragnar N. Nilsen, Parsippany, N.J., assignors to Vitro Corporation of America, New York, N.Y., a corporation of Delaware
Filed Jan. 5, 1966, Ser. No. 518,943
Int. Cl. H03k 5/00, 17/00
U.S. Cl. 328—151
2 Claims

ABSTRACT OF THE DISCLOSURE

The probable presence of a signal of known duration T is indicated in the presence of admixed gaussian noise by (a) dividing the noise-signal energy into periodic sampling intervals, (b) generating binary "1" and "0" samples corresponding to these intervals when the amplitude of the energy is, respectively, above and below a quantizing threshold level which is variable by closed loop control to maintain in a predetermined range the ratio of said level to the long term R.M.S. value of the noise, (c) passing the samples through a shift register of a temporal length approximating T, (d) obtaining from the outputs of the register a running sum of the sample values stored in the register, (e) producing an output indication when such sum exceeds a selected value.

This invention relates to systems employing statistical techniques for distinguishing between signal and noise characteristics of electrical energy received after transmission through space (e.g., radio, radar or telemetric transmissions) or by wire (e.g. Teletype transmissions). More particularly, this invention relates to systems of such sort for deriving statistical information concerning a characteristic or characteristics (one of which may be presence or absence) of one or more signals which are more or less masked by a background of gaussian noise.

In accordance with the invention, the received energy is operated on to derive therefrom a succession of sample indications of such energy. Each of those indications represents in a quantized manner (i.e., by one of a plurality of integral digital values as, say, the binary values "1" and "0") the "greater" or "less" relation between a sampled characteristic of the received energy and one or more threshold levels.

A plurality of such indications are then subjected to an electrically simulated statistical test wherein those indications are collectively compared to a generated electrical condition representing a statistical decision criterion, and wherein the satisfaction of that condition by those indications collectively provides a probability measure of a parameter (which may be presence or absence) of a postulated signal in the received energy. Satisfaction of the mentioned condition is indicated by an output signal from the system.

For a better understanding of the invention, reference is made to the following description of representative embodiments thereof, and to the accompanying drawings wherein.

Figure 1:
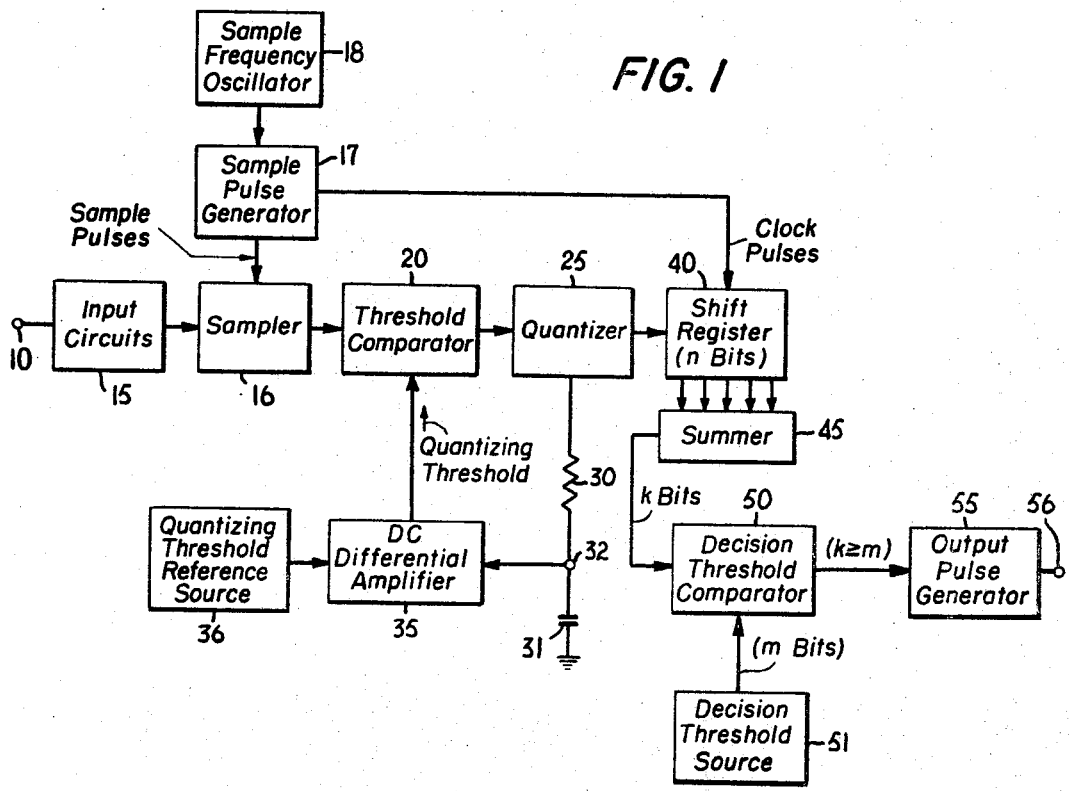
FIG. 1 is a block diagram of an exemplary system in accordance with the invention.

Referring to FIG. 1, an input 10 receives a time flow of electrical energy comprised of gaussian (i.e., "white") noise and, possibly, of a signal or signals to be detected (i.e., to be distinguished from the background of noise). While the noise is continuous, the signal is discontinuous so as to be of "pulse" form. The signal to be detected has a known duration T and a known waveform shape. The repetition rate of such signal may (but need not be) unknown, and that repetition rate may be random.

The received energy at input 10 is supplied to input circuit 15 which may include a preamplifier, and which may further include a full wave or half wave rectifier in the instance where the expected signal is in the form of modulation on a carrier. After being processed in the input circuits 15, the received energy is transmitted to sampler unit 16 to which is supplied another input in the form of a train of pulses from a sample pulse generator 17. Those pulses are produced as responses of generator 17 to the continuous wave output of a sample frequency oscillator 18. The pulses serve in unit 16 to derive from the received energy a continuous succession of samples of that energy. The frequency of oscillator 18 is adjusted to yield $n$ samples over a time interval of receiving of the input energy which is preferably equal to T but may be somewhat greater or lesser so long as such interval is a workably close approximation to the duration T of the expected signal.

The described samples are supplied as an output to a threshold comparator unit 20 within which the amplitude of each sample is compared to the level of a quantizing threshold D.C. voltage generated in a manner later described.

The output of comparator 20 is a voltage which, for each sample, is proportional to the difference between the amplitude of that sample and the level of the quantizing threshold voltage. That is, if the amplitude of the sample is $A_1$ (taking into account both magnitude and polarity) and the level of the threshold voltage is $A_2$ (taking into account both magnitude and polarity), then the comparator converts each input sample into a "difference" sample characterized by a voltage proportional to the quantity $A_1-A_2$.

The "difference" samples from unit 20 are supplied to a quantizer 25. Unit 25 responds only to the ones of such samples for which $A_1-A_2$ is greater than zero to produce for each such sample an electrical output pulse of unit amplitude. Hence, considering any train of input samples to companator 20, those of the samples within the train which exceed the quantizing threshold level are ones which each cause the production from unit 25 of an indication in the form of the presence of the corresponding pulse. Conversely those of the samples within such train of which the amplitude is squal to or lesser than the threshold level are ones which each cause the production from unit 25 of an indication in the form of the absence of a corresponding pulse.

Unit 25 thus serves to quantize the samples of the received energy by converting those samples into a corresponding succession of indications in the form of binary digital codings. In the FIG. 1 system each such coding is comprised of a single binary bit which may have either the digital value "1" (represented by the presence of a unit amplitude pulse) or the digital value "0" (represented by the absence of a pulse).

The binary bit pulses from unit 25 are supplied by one output from that unit to an integrator circuit comprised of a resistor 30 and a capacitor 31 having a junction 32 with the resistor. That circuit develops in a well-known manner at junction 32 a continuous voltage which is proportional in amplitude to the long term average of the number of pulses received per unit time from unit 25.

The voltage at junction 32 is supplied as a feedback voltage to one input of a differential amplifier 35. Another input of that amplifier receives from a voltage source 36 a reference voltage which is selectively adjustable to remain at a desired constant value. Amplifier 35 produces the previously described threshold voltage (supplied to unit 20) as a function of the difference between the respective amplitudes of the feedback voltage from junction 32 and the reference voltage from source 36. That is, if there is an increase in the number of pulses per unit time to integrator circuit 30, 31 so as to increase the feedback voltage at junction 32, the increase in that voltage causes an increase in the difference seen by amplifier 35 so as to cause a corresponding increase in the threshold voltage supplied to unit 20. Conversely, a decrease in the number of pulses received per unit time by integrator 30, 31 results in a decrease in the threshold voltage supplied to unit 20.

The elements 20, 25, 30–32, 35, 36 thus form a closed loop by which the value of the threshold voltage is varied in a controlled manner as a function of the long term average of the number of pulses per unit time from element 25 so as to maintain substantially constant the value of such long term average. The long term average value can be adjusted as desired by appropriate setting of the reference voltage from source 36. The purpose served in so relating the threshold voltage level to the long term average of the number of pulses developed per unit time by unit 25 is later explained.

The output of binary bit pulses from quantizer 25 is also supplied to a shift register 40 having $n$ stages for the received bits. Register 40 is thus adapted to store at any time a plurality $n$ of indications or bits which have been derived from an interval of the received energy equal to or closely approximating the duration T of the signal expected to be present in that energy. The transfer of the bits through the register is produced by clock pulses developed by sample pulse generator 17 in synchronous relation with the sample pulses supplied by that generator to sampler unit 16. Because of the synchronous relation, the rate of shifting of bits through register 40 is equal to the rate at which the received energy is sampled.

The $n$ stages of register 40 are each coupled to a respective one of $n$ inputs for a summer circuit 45 adapted at any time to produce a sum signal proportional in amplitude to a sum of the values associated with the $n$ bits then in the register. Specifically, if $k$ out of $n$ of those bits have at a given time a binary value of "1" and the remaining $n-k$ bits have at that time a binary value of "O," then the sum signal is proportional in value to a sum of the respective values of such $k$ bits. As later explained, the referred to "sum of values" may be either a sum in which the individual values of the $k$ bits are uniformly weighted or, alternatively, a sum in which those individual values are assigned different selected weights before the summing is effected.

The sum signal from summer 45 is supplied as one input to a decision threshold comparator unit 50. Another input to unit 50 is provided in the form of a decision threshold D.C. voltage generated by a voltage source 51. The level of the decision voltage from source 51 is selectively adjustable and is simulative of and proportional to the sum of the values of $m$ bits of binary value "1" out of the total of $n$ bits contained at any time in the shift register 40.

Within unit 50, the sum signal from summer 45 is compared to the decision threshold level supplied from source 51. If the amplitude of the sum signal is less than the level of the decision threshold, unit 50 provides no output. If, on the other hand, the amplitude of the sum signal is at any time equal to or greater than the level of the decision threshold, then the unit 50 triggers an output pulse generator 55 to develop a pulse which is the output signal from the system. That output signal appears at output terminal 56 and indicates the probable presence of a signal in the received energy.

The electrical operation of unit 50 simulates the subjecting of the $n$ bits in the register to a statistical test for detecting the probable presence of an input signal. To wit, the sum signal is, as stated simulative of a sum of the values of the $k$ out of $n$ bits in the register which have a value of "1," and the level of the decision threshold simulates the statistical condition that such sum of values must be equal to or greater than the sum of values of $m$ bits of value "1" out of the mentioned $n$ bits. When that condition is satisfied, there is produced an output signal which indicates to a computable probability value the detection of a signal in the received energy.

The type of statistical test just described is referred to herein as an "$m$ out of $n$" decision. Such decision may be either an "unweighted" decision (all "1" binary bits are given the same weight in forming the sum signal) or a "weighted" decision (different binary "1" bits are given different weights in forming the sum signal).

Figure 2:
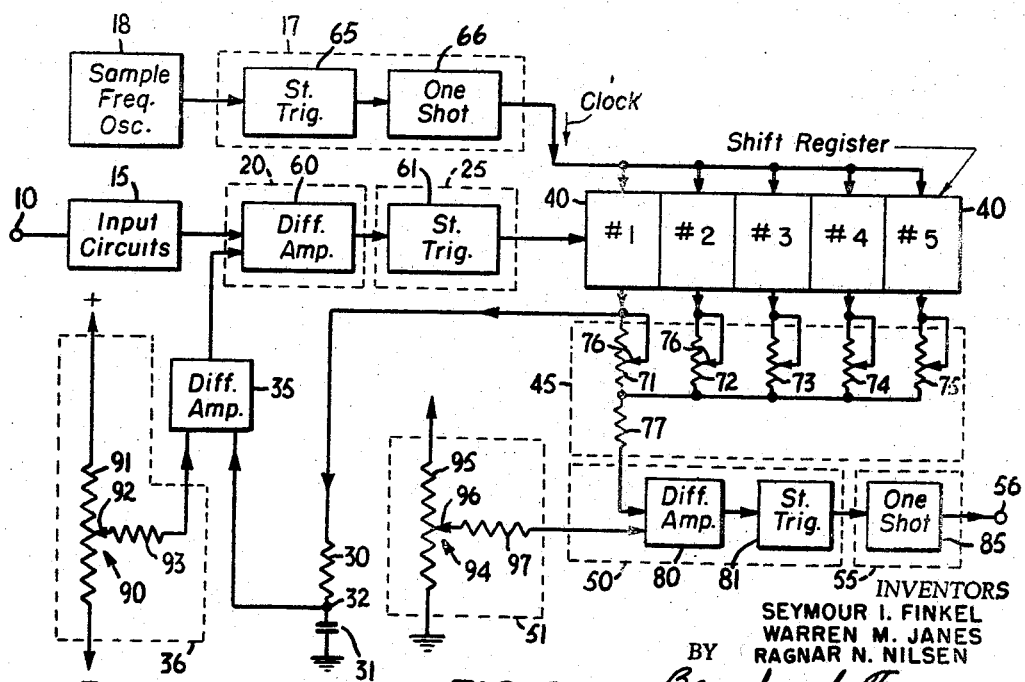
FIG. 2 is a partly block and partly schematic diagram of a modification of the system of FIG. 1.

FIG. 2 is a diagram of the FIG. 1 system as modified to eliminate a separate sampler unit and to incorporate other simplifications. In the FIG. 2 system, the components which also belong to the FIG. 1 system are designated by the same reference numerals.

In the FIG. 2 system, the received energy is fed directly from the input circuits 15 to the quantizer 20 provided by a difference amplifier 60 adapted to yield a continuous output proportional in amplitude at any time to the difference between the amplitude of the received energy and the level of the quantizing threshold voltage received from amplifier 35. The output of amplifier 60 drives a Schmitt trigger 61 providing the quantizer 25. If the Schmitt trigger 61 sees a negative or zero input, then the trigger provides no output. If, in contrast, the Schmitt trigger sees a positive input, then the trigger 61 provides a positive output of fixed amplitude. In this way, the component 61 quantizes the amplitude variations of the received energy into an output wave which varies abruptly between the values "1" and "0" at non-periodic times corresponding to the times at which the amplitude of the received energy crosses the quantizing threshold level. As yet, there has been no discrete sampling of the received energy.

The output wave of the Schmitt trigger 61 is applied to the input of stage #1 of shift register 40 within which the shifting action is effected by clock pulses from sample pulse generator 17. As shown, that generator is comprised of a Schmitt trigger 65 driven by oscillator 18 and of a one-shot multivibrator 66 driven by trigger 65. The Schmitt trigger 65 responds to the continuous wave output of oscillator 18 to produce a square wave of the same frequency as the continuous wave. The multivibrator 66 in turn responds to the positively rising edge of each square wave from trigger 65 to produce a corresponding clock pulse for the shift register 40.

The shift register responds as follows to the output wave from Schmitt trigger 61. If, in the period between two consecutive clock pulses, that output wave is of "0" value, stage #1 of the register is disabled and accordingly stores a "0" bit which is subsequently transferred through the register. If, on the other hand, the mentioned output wave has a "1" value in such period, register stage #1 is enabled and accordingly stores a "1" bit for subsequent transference through the remaining stages of the register. The bits transferred through the register represent the quantized samples of the received energy.

In the FIG. 2 system, therefore, the shift register 40 performs both of the functions of sampling the received energy and of providing shifting storage of the binary bits derived from the sampling. A further difference between the FIG. 1 and FIG. 2 systems is that in FIG. 1 the sampling of the received energy takes place before the quantizing of its amplitude into the binary digital values "1" and "0," whereas in FIG. 2 the quantizing takes place before sampling.

The shift register 40 of the FIG. 2 system has five stages such that $n$ equals 5. The number $n$ of stages in the register is equal to or closely approximates the duration T of the expected signal divided by the period $t$ of the sampling clock pulses. That is, $n$ equals $T/\Delta t$ or, to put it another way, T equals $n\Delta t$ wherefore the number $n$ of bits stored at any time in register 40 are derived from consecutive time sub-intervals of the received energy which together form an interval long enough to accommodate exactly (or to a workable approximation) the whole duration of the expected signal.

The FIG. 2 system may be designed to employ a large value of $n$ (e.g., 10, 20, 40) and a corresponding larger number of register stages by shortening the sampling period $\Delta t$ utilized in connection with a given signal duration T. Such shortening of the sampling period $\Delta t$ increases the range of frequency response required of the system in order to render independent of each other the values acquired by the bits loaded into the register. Hence, as $\Delta t$ is shortened, the bandwidth of the system is linearly increased in direct proportion to the value $1/\Delta t$, i.e., the value of the sampling rate or frequency. As later pointed out, however, the paired use in the system of a large $n$ and a correspondingly wide bandwidth does not detract significantly from the signal-resolving ability of the system, and, furthermore, has the advantage that the response of the system is rendered largely independent of the shape of its band-pass characteristic.

The output of the five stages of register 40 are each connected to a respective one of five parallel resistors 71–75 coupled together in a conductive summing network providing the summer unit 45. Each of resistors 71–75 has the same end to end conductance but each is adjustable in conductance by a tape 76 slidable over the resistor and connected to the end thereof towards the register. At any time, a stage of register 40 which is then storing a binary "0" bit produces no current through its corresponding resistor, but any stage of the register then storing a binary "1" bit produces through the corresponding resistor a current proportional to the product of the value "1" and the effective conductance of that resistor. Hence, the output of resistors 71–76 is a sum of currents of which the value at any time is determined by the $k$ bits than in the register which are of binary value "1." As is apparent, the register 40 and the summing network form together a digital-to-analog converter.

The described sum of currents is supplied to one input of a difference amplifier 80 through an isolating resistor 77 (of much higher conductance than the end to end conductance of any of parallel resistors 71–75). At that input, the sum of currents is converted into a substantially proportional voltage providing the "sum signal" of the system.

Amplifier 80 also receives an input of the decision threshold voltage from source 51, and the amplifier produces an output proportional to the difference between the sum signal and the level of the decision threshold voltage. The amplifier output drives a Schmitt trigger 81 which, with element 80, forms the decision threshold comparator unit 50. When the amplifier output is zero or negative, the output of the Schmitt trigger is zero. When the amplifier output goes positive, the trigger responds by rising sharply to a "1" level and by remaining at that level until the amplifier output returns to zero or goes negative. The output of the Schmitt trigger thus consists of non-periodic positive square waves.

Schimitt trigger 81 drives a one-shot multivibrator which provides the output pulse generator 55. The function of multivibrator 85 is to convert each sharp positive rise of the Schmitt trigger output into a short pulse. Each such pulse is supplied to output terminal 56 as an output signal of the system.

As shown by FIG. 2, the source 36 of the reference voltage for the quantizing threshold level is in the form of a potentiometer 90 comprised of a resistor 91 contacted by a slidable tap 92 from which the reference voltage is taken through an isolating resistor 93. Similarly, the source 51 of the decision threshold voltage is in the form of a potentiometer 94 comprised of a resistor 95 contacted by a slidable tap 96 from which the last-named voltage is taken through an isolating resistor 97. In the FIG. 2 system, the pulses fed to the integrator 30, 31 are taken from the output of stage #1 of register 40.

The systems of FIGS. 1 and 2 may consist entirely of solid state circuits. While the quantizing threshold comparator 20 has been described as receiving only a single threshold level, alternatively, units 20 and 25 may be designed to compare the received energy with a plurality of threshold levels so as to quantize that energy into more integral digital values than the two binary values "1" and "0." In that instance, the codings representing the quantized samples of energy take the form of multibit codings or "words" which each represent in binary digital form the quantized value, and which are each stored as an entity in each stage of the shift register and are transferred as an entity from stage to stage of the register. Further in that instance, a sum of the quantized values stored in the shift register is obtained by employing a digital-to-analog converter for each register stage to convert the value of the multi-bit word stored therein into analog form, and by then summing the analog signals which result. Whether the number of quantizing threshold levels employed is one or more than one, it is not necessary that a summer and a decision threshold comparator of the analog type be utilized to make the "$m$ out of $n$" statistical determination. Instead, the "$m$ out of $n$" statistical test may be carried out by a digital logic network which is comprised of AND, or OR circuits or both, and which responds only to particular permutations or combinations of the quantized values represented by the $n$ codings in the register to produce an output signal indicating the probable presence of a signal in the received energy.

THEORY OF OPERATION

*Rectangular waveform signal.*—In the systems of FIGS. 1 and 2, the time flow of received energy is or can be considered to be subdivided into consecutive samples which are compared to a quantizing threshold level. The threshold distribution function, i.e., the probability that a sample of signal-plus-noise will exceed a threshold level X, is given by:

$$T(X) = \int_{x=X}^{\infty} p(x) dx \quad (1)$$

where $p(x)$ is the probability density distribution of signal-plus-noise, and is given by the gaussian distribution:

$$p(x) = \frac{1}{\sqrt{2\pi\sigma^2}} e^{-\frac{(x-S)^2}{2\sigma^2}} \quad (2)$$

where:

$\sigma$ = standard deviation
S = pulse amplitude = mean value

The threshold distribution function is, therefore:

$$T(X) = \frac{1}{2}\left[1 - E_2\left(\frac{X-S}{\sqrt{2\sigma^2}}\right)\right] \quad (3)$$

where $E_2(X)$ is defined by:

$$E_2(X) = \frac{2}{\pi} \int_{u=0}^{X} e^{-u^2} du \quad (4)$$

Numerical values of the error integral, $E_2(X)$ are available in tabular form (e.g. Janke and Emde, Tables of Functions).

The threshold distribution function, given by Equation 3, has been calculated for a range of signal-to-noise ratios $S/\sigma$ (pulse amplitude—R.M.S. noise). The results are shown graphically in FIG. 3. Note in FIG. 3 that the horizontal scale is for $X/\sigma$ which is the ratio of the threshold level X to the R.M.S. value of the noise. Note also in FIG. 3 that the lowermost curve is obtained when $S=0$ and when, accordingly, noise alone is present.

In the described systems, the composite rectangular pulse-plus-Gaussian noise signal is converted to a digital representation by a process of sampling and of comparison of the sampled signaled signal-plus-noise to an amplitude threshold. The signal is sampled at equally-spaced intervals $\Delta t$, and the samples are converted to one of two logic-level binary states depending upon whether the amplitude of each individual sample is above or below the comparison threshold level. Statistical techniques are then applied to the binary pulse train representing the original signal, to the end of providing probabilistic definitization of false-alarm rates and detection probabilities at specified signal-to-noise ratios.

The sampling process is matched to the pulse duration and the noise bandwidth of the system. Decisions are based on the statistical contents of $n$ samples. The figure $n$ is related to pulse duration and sampling frequency by:

$$n = T/\Delta t$$

where:

T = pulse signal width
$1/\Delta t$ = sampling frequency

The noise bandwidth of the system is such that successive samples of noise are uncorrelated. This amounts to sampling at the Nyquist rate, and the systems noise bandwith is therefore given by:

$$W = 1/2\Delta t \qquad (6)$$

The statistical detection criterion used is based on the number of samples, out of a group of $n$ successive samples, in which the amplitude comparison threshold level is exceeded. A decision as to the presence or absence of a pulse signal in the received energy is based upon whether the number $k$ of samples which exceed the comparison threshold is greater than or less than, respectively, a digital decision threshold number $m$. This detection is referred to as an "$m$-out-of-$n$" decision, and is based on the gross statistics of the $n$ sample bits. In the case of a rectangular pulse signal, the determination as to whether $k \geq m$ is made by comparing the unweighted sum of the binary "1" values of the $k$ samples to a decision threshold level corresponding to the unweighted sum of $m$ bits of value "1" out of the total of $n$ bits.

Now, if the signal to be detected against the background of noise is of rectangular waveform, each individual sample has the same probability of exceeding the threshold. Hence, if $p$ is the probability that an individual sample exceeds the quantizing threshold, the probability that exactly $k$ samples out of the total of $n$ will all exceed the quantizing threshold is given by the binomial probability distribution:

$$b(k, n, p) = \frac{n!}{k!(n-k)!} p^k (1-p)^{n-k} \qquad (7)$$

The probability that the statistical decision threshold, $m$, is exceeded in an "$m$-out-of-$n$" decision detector is the sum of probabilities of that occurrence when $k$ has any value between and including $m$ and $n$, i.e., $k \geq m$. Therefore, the detection probability $P_d$ is given by the partial cumulative sum:

$$P_d(m, n, p) = \sum_{k=m}^{n} b(k, n, p) =$$

$$\sum_{k=m}^{n} \frac{n!}{k!(n-k)!} p^k (1-p)^{n-k}$$

Even when the received energy does not contain the signal to be detected, the noise-induced random variations in the sample amplitudes will produce occasional satisfaction of the "$m$-out-of-$n$" test so as to generate a "false alarm," i.e., indicate that a signal is present when, in fact, no signal is present. The false alarm rate for the described system is equal to the detection probability $P_d$ computed by Equation 8 when $S = 0$ and the variable $p$ is the noise bit probability $p_N$, i.e., the probability that noise alone will cause any individual sample to exceed the quantizing threshold level. That is, given any value of $m$, any threshold level and any $\sigma$ (the R.M.S. value of the noise), by computing the value of the ratio $X/\sigma$, using the lowermost curve of FIG. 3 to determine from the vertical scale of FIG. 3 the corresponding value of $p_N$ and employing that value of $p_N$ in Equation 8, the equation yields a detection probability figure $P_d$ which is the false alarm rate for the system for those values of $m$ and $X/\sigma$. The false alarm rate may be, for example, .001 which means that there is one chance in a thousand that the system will indicate the presence of a signal when none is present.

Figure 3:
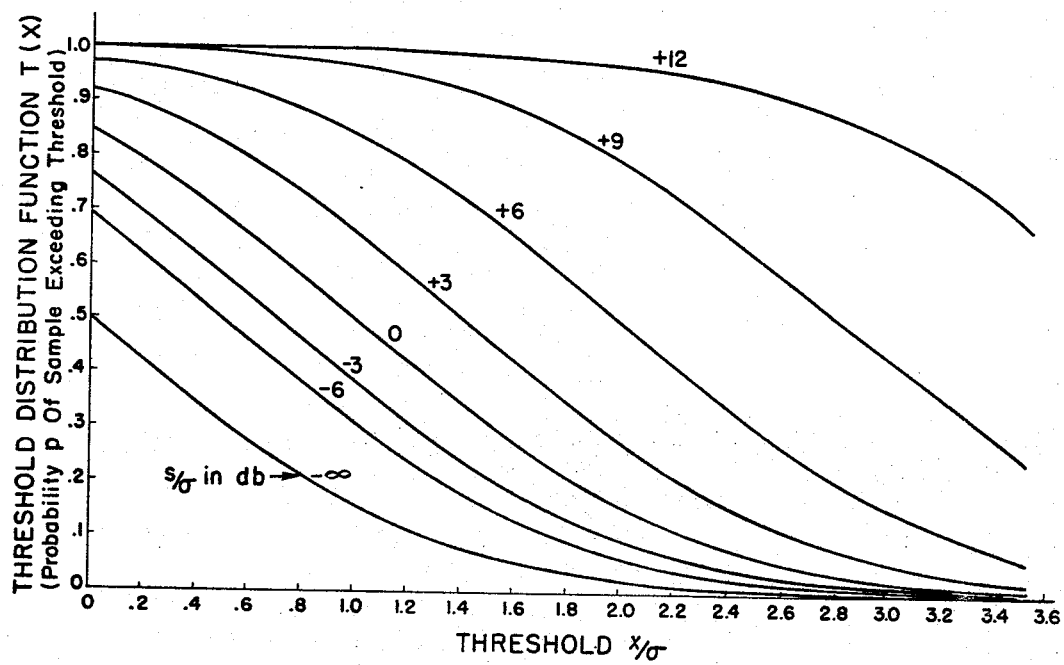
FIGS. 3, 4 and 5 are graphs explanatory of the operation of the systems of FIGS. 1 and 2.

Suppose, on the other hand, that $p$ in Equation 8 represents the probability $p_s$ (for given values of $S/\sigma$ and $X/\sigma$) of a signal-plus-noise sample exceeding the quantizing threshold level X. Then Equation 6 may be used to compute for a given value of $m$ the probability of detection $p_d$ of the signal. Specifically, the graph of FIG. 3 is entered at the given value of $X/\sigma$ and is used with the curve of appropriate $S/\sigma$ value to determine from the vertical scale of FIG. 3 the value of $P_s$, and that value of $P_s$ is then employed (with the given value of $m$) in Equation 8 to compute $P_d$. A value of $P_d$ of say 0.80 means that the odds are 80 out of 100 that the described system will produce an output signal when an input signal is present in the received energy.

In practice, what is usually specified is the maximum false alarm rate for the system. Hence, in practice, Equation 8 is worked "backwards" to determine from a specified false alarm rate (equal to $P_d$ when $p = p_N$) the values of the other variables $p_N$ and $m$ of the equation. As pointed out hereinafter, there is an optimum range of values for $p_N$, wherefore it is desirable to fix $p_N$ at some particular value in that range. When, however, $p_N$ is so fixed, the value of $m$ is uniquely fixed or determined for a given specified false alarm rate, and that rate becomes a function of only $m$.

Thus, by maintaining $p_N$ in the system of 1 and 2 at a fixed value (in a manner later described), the false alarm rate for the system is determined by the setting of the level of the decision threshold voltage from source 51. The relation is that the higher such level, the lower the false alarm rate.

Coming now to selecting a value for $p_N$, we have discovered that the systems described herein perform optimally in detecting the probable presence of a signal when the $p_N$ value is within a particular range. To explain further, an estimate of the optimum value for the ratio $X/\sigma$ in terms of the corresponding noise bit probability $p_N$, can be obtained by considering a reasonable definition of the effective signal-to-noise ratio of the quantized signal as follows:

$$(S/N)_{out} = \frac{(\text{mean of distribution for } S+N) - (\text{mean for noise alone})}{\text{standard deviation for noise alone}}$$

(9)

For the binomial distribution, the mean and the standard deviation are given by:

$$k = np = \text{mean number of bits} \qquad (10)$$

$$\sigma = np(1-p) = \text{standard deviation}$$

Therefore, the effective $S/N$ ratio defined in Equation 9 becomes:

$$(S/N)_{out} = \frac{n(p_s - p_N)}{\sqrt{n p_N (1-p_N)}} = \sqrt{n} \frac{(p_s - p_N)}{\sqrt{p_N(1-p_N)}} \qquad (11)$$

Figure 4:
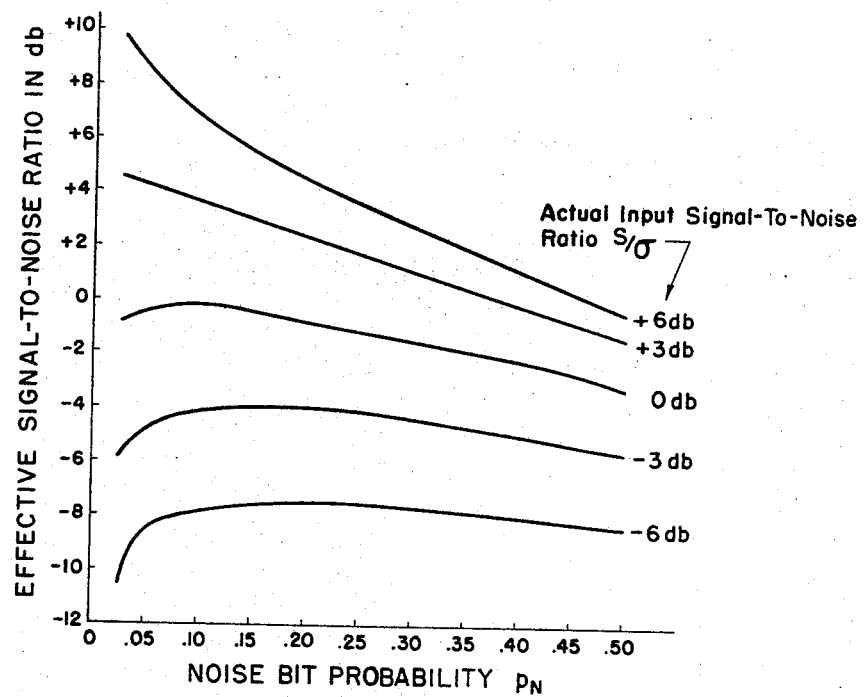

Using Equation 11, the effective signal-to-noise ratio was calculated as a function of $p_N$ and the actual input signal-to-noise ratio $S/\sigma$. Values for $p_S$, corresponding to various input signal-to-noise ratios $S/\sigma$, were obtained from the curves of FIG. 3. The results, shown graphically in FIG. 4, indicate that for optimum detection of small signals the quantizing threshold should be set to give noise bit probabilities in the range $0.05 \leq P_N \leq 0.3$. Those results are not exact, but they do indicate the range of values to be utilized.

Exact calculations have been made of the detection probability $P_d$ versus signal-to-noise ratio $S/\sigma$ for several sample sizes ($n=10, 20, 40$) and for the range of $p_N$ indicated by the approximate results derived above (i.e., $p_N=.05, .1, 12, .3$). The digital decision threshold $m$ (for an "$m$-out-of-$n$" decision), associated with the particular value of sample size $n$ and noise bit probability $p_N$, was chosen to obtain maximum false alarm rates in the range from 0.00001 to 0.001. The results were that the optimum value of $p_N$ was found to fall in the range $1 \leq p \leq .2$, the exact value depending somewhat on the false alarm rate and sample size $n$. The detection sensitivity, however, does not change greatly over this range of values of $p_N$ inasmuch as the required signal-to-noise ratio to give equal detection probability of the signal varies by only approximately 0.5 db over the above optimum range of $p_N$ for a fixed false alarm rate and sample size.

Referring back to FIG. 3, by utilizing the vertical scale to enter the graph and by utilizing the lowermost curve (for which the signal amplitude $S=0$), it will be seen that the range $0.05 \leq p \leq 0.3$ which is optimum for $p_N$ corresponds to a range for $X/\sigma$ which extends between and includes the values 0.5 and 1.9. Hence, for $p_N$ to be optimum, the ratio of the threshold level X to the R.M.S. value $\sigma$ of the noise should be within the last-named range.

The systems of FIGS. 1 and 2 are adapted to select and maintain a particular optimum value for $p_N$ by the closed loop subsystem which determines the value X of the quantizing threshold. Specifically, a noise bit probability $p_N$ of, say, 0.2, means that, when noise alone is present in the received energy, two out of every ten samples of the energy will, over the long term, exceed the quantizing threshold level X. Hence, assuming a low duty cycle and relatively low $S/\sigma$ for the signal to be detected a direct measure to a good approximation of the $p_N$ characterizing the system at any time is the long term average of the number of pulses received per unit time by integrator circuit 30, 31. As explained hereinbefore, the value of that long term average is kept substantially constant by the action of the closed loop in varying the threshold level X in response to a change in the R.M.S. value $\sigma$ of the noise. Hence, despite slow variation in the R.M.S. value $\sigma$, the closed loop serves to keep $p_N$ substantially constant at a value determined by the setting of the reference voltage from source 36. As indicated that value at which $p_N$ is maintained is preferably in the range 0.05–0.3, a particularly suitable value being 0.2.

While there is an optimum range of values for $p_N$, the optimum performance of the system is almost independent of the sample size $n$. That this is so is due to two opposing effects. First, as $n$ is increased, the system bandwidth must be increased in proportion to $n$ in order for successive noise samples to remain uncorrelated. When the system bandwidth is increased in proportion to $n$, the input signal to noise ratio decreases as $\sqrt{n}$. On the other hand, as $n$ is increased, the statistical decision process provides an integrating effect such that the effective output signal to noise amplitude ratio increases approximately as $\sqrt{n}$ to substantially balance out the decrease in input signal to noise ratio caused by the larger system bandwidth.

It follows, that if the system were to have an ideally shaped bandpass characteristic, there would be little advantage in making $n$ large. In practice however, the shape of the bandpass characteristic of the system is always somewhat distorted from ideal configuration, wherefore making $n$ large and the system bandwidth correspondingly large does have the practical advantage of minimizing the effect of such distortion on the response of the system.

We have discovered that the discussed "$m$-out-of-$n$" decision is the statistical test having the most "power" (i.e., subject to the least error) for determining the probable presence of a signal in the received energy. The employment of such "$m$-out-of-$n$" test imparts to the described systems a theoretical detection sensitivity (which has been experimentally verified) which is only 2–3 db. less than that of a system in which pulse signals are detected by an ideal linear matched filter and a threshold detector. That such is so is shown by the following analysis.

For a linear matched filter, the signal-to-noise power ratio at the output is given by:

$$(S/N)_{\text{power out}} = \frac{2E}{W_0} \qquad (12)$$

where:

$E$=pulse signal energy
$w_0$=noise power per c.p.s. bandwidth.

For the rectangular pulse considered here, the pulse energy is:

$$E = S^2 T \qquad (13)$$

where:

$S$=pulse amplitude
$T$=pulse duration.

The noise power density is $$w_0 = \sigma^2 / W \qquad (14)$$

where:

$\sigma^2$=noise power
$W$=noise bandwidth.

Therefore, the output signal-to-noise power ratio of Equation 12 becomes:

$$(S/N)_{\text{power out}} = \frac{2WTS^2}{\sigma^2} \qquad (15)$$

From Equation 5, pulse duration T is related to the sample size $n$ by $T = n\Delta t$. Therefore, Equation 15 becomes:

$$(S/N)_{\text{power out}} = (2W\Delta t)\frac{nS^2}{\sigma^2} = \frac{nS^2}{\sigma^2} \qquad (16)$$

Where, from Equation 6, $2W\Delta t = 1$ if the sampling frequency is at the Nyquist rate. The output signal-to-noise amplitude ratio is, therefore:

$$(S/N)_{\text{amplitude out}} = \sqrt{n}(S/\sigma) \qquad (17)$$

The detection probability for threshold detection of the matched filter output of Equation 17 can be calculated using the threshold distribution function defined in Equation 3. The false alarm rate is the probability of exceeding the amplitude comparison threshold with noise alone (i.e., $S=0$). Using Equation 3, with T(X) set equal to false alarm rate $\alpha$, the threshold level is given by:

$$E_2(X/\sqrt{2\sigma^2}) = 1 - 2\alpha \qquad (18)$$

With the ratio $X/\sigma$ calculated from Equation 18, the detection probability as a function of signal-to-noise ratio is found from the solution of Equation 3, $S/\sigma$ being set equal to the matched filter output signal-to-noise ratio given by Equation 17.

Figure 5:
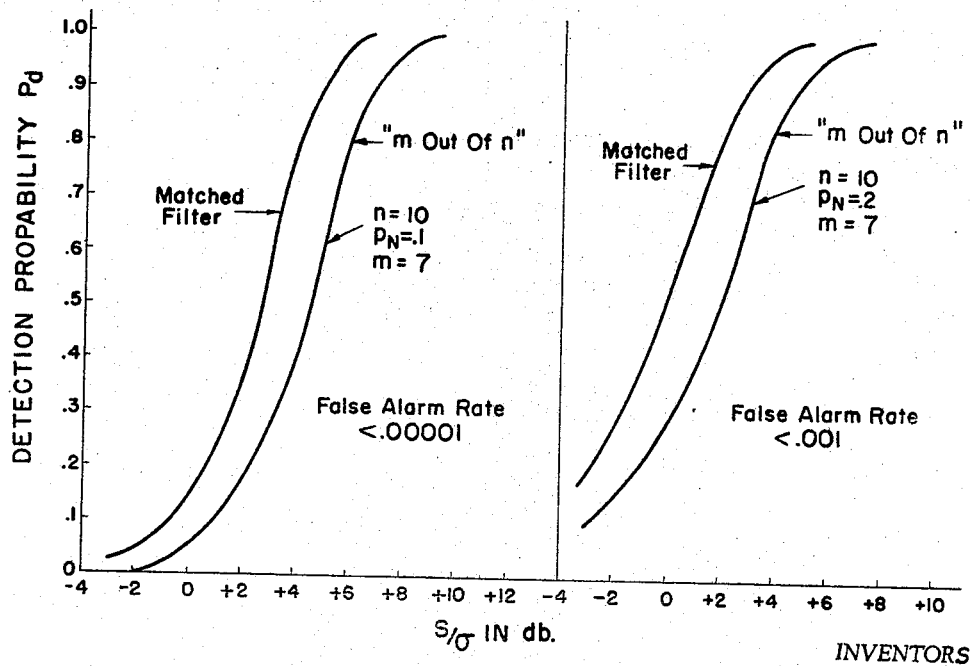

Matched filter detection probabilities have been calculated for $n=10$ and false alarm rates of 0.00001 and 0.001. These results are compared graphically in FIG. 5 to the corresponding "$m$-out-of-$n$" decision detector. It is seen from FIG. 5 that the "$m$-out-of-$n$" decision detector provides a theoretical detection sensitivity which is about 2 db less than that of an ideal matched filter and threshold detector.

*Non-rectangular waveform signal.*—For the rectangular pulse signals considered previously, the probability of exceeding the threshold is the same from bit-to-bit during the duration of the signal or during any interval in which no signal is present (noise only). This results in binomial probability distribution, and in that instance, we have found that the most powerful statistical test is a simple unweighted $m$-out-of-$n$ decision.

For non-rectangular pulse waveforms the probability of exceeding the threshold is still the same from bit-to-bit when no signal is present (noise only), but this is no longer the case for signal-plus-noise, since the threshold probability $p_s$ now depends upon the signal-to-noise ratio associated with the particular sample bit. The probability distribution function for the aggregate of $n$ sample bits is therefore no longer binomial and application of the "$m$-out-of-$n$" decision is preferably carried out on a weighted point-by-point basis for the various possible binary bit distributions which can arise from the sampling process. Such a weighted decision is made as follows, it being assumed that the signal to be detected is subdivided into $n$ samples and has a known amplitude in each sampling period.

Assume a representative value for $p_N$ (determined in accordance with lowermost curve of FIG. 3 by the ratio $X/\sigma$ provided by the closed loop of the system), and assume further a representative value for $\sigma$, the R.M.S. value of the noise. From this data, compute for each of the $n$ samples the signal-to-noise ratio $S/\sigma$. Then determine from the curves of FIG. 3 for the assumed value of $X/\sigma$ and for the particular value of $S/\sigma$ characterizing each sample the probability $p_s$ that each such sample will exceed in amplitude the quantizing threshold level X. By such procedure, the following exemplary results are obtained where $n=5$, $p_N=0.2$ and the signal to be detected is characterized by a linearly rising sawtooth waveform of an amplitude related to $\sigma$ such that $S/\sigma$ at the beginning and end of the sawtooth rise has, respectively, a value of 0 and a value of 12 db.

| Sample Bit Number | $S/\sigma$ | $S/\sigma$, db | Probability $p_s$ of Exceeding Threshold |
|---|---|---|---|
| 1 | 0 | $-\infty$ | .2 |
| 2 | .8 | $-1.9$ | .52 |
| 3 | 1.6 | 4.1 | .78 |
| 4 | 2.4 | 7.6 | .94 |
| 5 | 3.2 | 10.1 | .99 |

The next step is to give to each of the $n$ samples a weight in proportion to the probability $p_s$ that such sample will exceed the quantizing threshold. Thus, in the example provided by the foregoing tabulation, samples 1, 2, 3, 4 and 5 are given relative bit weights of 2, 5, 8, 9 and 10 respectively.

In the described systems (FIGS. 1 and 2) the selective weighting of the samples is carried out by adjusting the $n$ parallel resistors of the summer 45 so that the conductances of those $n$ resistors are in the same relative proportion to each other as the respective probabilities $p_s$ which the corresponding $n$ signal-plus-noise samples have of exceeding the quantizing threshold. When the $n$ resistors have so been adjusted, their sum of currents output provides a sum signal representative of a weighted sum of the values of the $k$ out of $n$ binary bits in the register which have a binary digital value of "1." In other words, in the case of a pulse signal of non-rectangular waveform, the statistical test used to detect the probable presence of the signal is a weighted "$m$-out-of-$n$" decision.

For such a weighted decision, the setting of the decision threshold level to provide a specified false alarm rate is determined by a "cut and try" procedure as follows. First, a correspondence is established between the decision level and the sum of the nominal weights of the $n$ resistors in that if, say, there are five such resistors having nominal weights of 2, 5, 8, 9 and 10, then the sum of such weights (i.e., 34) is the value assigned to the level of the decision threshold voltage at which all five of the bits in the register must be binary "ones" in order for the sum signal from the resistors to equal the decision threshold level. For lower decision threshold levels, the "sum of weights" value assigned to that level is proportionately lower.

Now assume for the considered example where $n=5$ that the decision threshold level has been set to have a "sum of weights" value of 25. For that value, the level will be equaled or exceeded by the sum signal only when the sum signal is derived from one of the following permutations of binary bit "ones" and "zeros" in the register:

| Nominal weight for "1" bit in stage | Register stage | | | | | Sum of weights (See below) |
|---|---|---|---|---|---|---|
| | 1 | 2 | 3 | 4 | 5 | |
| | (2) | (5) | (8) | (9) | (10) | |
| Permutations | 1 | 1 | 1 | 1 | 1 | 34>25 |
| | 1 | 1 | 1 | 0 | 1 | 25=25 |
| | 1 | 1 | 0 | 1 | 1 | 28>25 |
| | 1 | 0 | 1 | 1 | 1 | 29>25 |
| | 1 | 0 | 1 | 1 | 1 | 29>25 |
| | 0 | 1 | 1 | 1 | 1 | 32>25 |
| | 0 | 0 | 1 | 1 | 1 | 27>25 |

The probability $f_0$ for each of the above permutations that the permutation will be produced by noise alone is computed by statistical methods. Moreover the probability $f_1$ for each of the above permutations that the permutation will be produced by signal plus noise is also computed. Then all such computed probabilities $f_0$ are summed to give the false alarm rate yielded by the selected decision threshold level, and all such computed probabilities $f_1$ are summed to yield the probability $P_d$ of detecting the signal under the conditions assumed for the example. If it turns out that the value selected for the decision threshold level yields a false alarm rate greater or less than that desired, then a new more appropriate value of the level is assumed and the described procedure is repeated until the level yielding the desired false alarm rate is arrived at. The detection probability $P_d$ corresponding to such false alarm rate can then be computed.

From the foregoing it will be evident that, given any pulse signal of any known waveform, the sample number $n$, the noise bit probability $p_N$ (or the value of the ratio $X/\sigma$) and the value of $S/\sigma$ of each of the $n$ signal-plus-noise samples, the general method of utilizing the weighted "$m$-out-of-$n$" test in the systems of FIGS. 1 and 2 is as follows:

(a) Compute for each of the $n$ samples the probability $p_s$ that the amplitude of such sample will exceed the quantizing threshold X.

(b) Assign to the $n$ binary bits (in the register) nominal weights in the same relative proportion as the computed probabilities $p_s$ of the corresponding $n$ samples.

(c) Select a trial "sum of weights" value for the decision threshold level.

(d) Determine which ones of all the possible binary permutations of the n *bits* will, when weighted as described, yield a sum of weighted values equal to or exceeding the trial sum of weights of the decision threshold level.

(e) For each permutation satisfying the condition set out in (d), compute the probability $f_0$ that, when the $n$ samples of received energy are provided by gaussian noise alone, particular ones of those samples will exceed in amplitude the quantizing threshold level so as to yield that permutation of $n$ bits.
Set on machine no. 47

(f) Add all the probabilities $f_0$ so computed to obtain as the sum thereof the false alarm rate which would be provided in the system by the first tried decision threshold level.

(g) In the event that false alarm rate is not satisfactory, select as per (c) a new trial "sum of weights" value for the decision threshold level, and keep on repeating steps (c) through (f) until the decision level yielding the satisfactory false alarm rate is determined.

(h) Upon arriving at the decision threshold level yielding the satisfactory false alarm rate, compute for each of the permutations of $n$ bits which then satisfies the condition set out in (d) the probability $f_1$ that, when the $n$ samples are each provided by signal-plus-noise, particular ones of those samples will exceed in amplitude the quantizing threshold level so as to yield that permutation.

(i) Add all the resulting probabilities $f_1$ to obtain a sum value. That value is the signal detection probability $P_d$ of the system for the finally selected false alarm rate under the initially given conditions.

We have discovered that a weighted "$m$-out-of-$n$" test of the sort described is (or closely approximates) the most powerful statistical test for detecting the presence in gaussian noise of a signal of any arbitrary waveform. Such test is a general test and includes as a special case the detection of a rectangular pulse signal wherein the $p_s$ for all signal-plus-noise samples is the same and wherein, accordingly, the general test prescribes that the weighting be uniform, i.e., that there be no weighting at all.

As compared to a conventional system for detecting a pulse signal embedded in gaussian noise by an analog filter matched to the waveform of the signal and by a threshold detector, systems in accordance with the present invention have numerous advantages among which are the following.

First, the systems hereof may be provided entirely by solid state circuits. The vast majority of those circuits are simple digital logic circuits, such as flip-flops, thereby providing long life and reliability.

Second, the use of many samples during the pulse signal duration provides an integrating effect which counteracts the increased system noise bandwidth required to insure statistical independence from sample to sample. System noise bandwidth can be made many times larger than the spectral bandwidth of the signal to be detected. Therefore, the system is relatively insensitive to the exact shape of its bandpass characteristic.

Third, the use of statistical decision techniques enable convenient and accurate setting of false alarm rates.

Fourth, the digital nature of the data processing, after the threshold quantization of the signal, results in consistently accurate and repeatable operation once the desired response has initially been set into the system.

Fifth, "matching" to any specified signal waveform is simple and easily obtained by selective proportioning of the respective conductances of the resistors in the digital-to-analog conversion section of the system, i.e., the resistors 71–75.

Sixth, the quantizing threshold is automatically controlled, as described, by a closed loop subsystem, so as to maintain a preset quantization probability with noise alone. By this means, the system can effectively be made dependent upon signal to noise ratio rather than absolute signal amplitude. Such condition of dependence only upon signal to noise ratio is automatically maintained independent of slowly varying changes in the background noise level. That is, the system adjusts to a background noise level with a time constant which is considerably longer than the duration of the signal.

A number of working examples of practical operating parameters for the systems described herein are as follows.

Example I

| | |
|---|---|
| Pulse signal waveform | Rectangular. |
| Input pulse width | $T=2$ milliseconds. |
| Pulse repetition rate | 20 p.p.s. |
| Shift register size | $n=20$ bits. |
| Sampling frequency | 10 kc. |
| Noise bandwidth (6 db) | 20 c.p.s.–5 kc. |
| Sample interval duration | 3 microseconds. |
| Noise voltage | 0.2 volt R.M.S. |
| Threshold noise probability | $p_N$=various values from 0.1 to 0.344. |
| False alarm rate | Various values from 0.0012 to 0.021. |
| Weighting | Uniform. |

Example II

| | |
|---|---|
| Pulse signal waveform | Rectangular. |
| Input pulse width | $T=2$ milliseconds. |
| Pulse repetition rate | 20 p.p.s. |
| Shift register size | $n=10$ bits. |
| Sampling frequency | 5 kc. |
| Noise bandwidth (6 db) | 20 c.p.s.–2.5 kc. |
| Sample interval duration | 3 microseconds. |
| Noise voltage | 0.2 volt R.M.S. |
| Threshold noise probability | $p_N$=various values from 0.1 to 0.37. |
| False alarm rate | Various values from 0.0016 to 0.0072. |
| Weighting | Uniform. |

Example III

| | |
|---|---|
| Pulse signal waveform | Rectangular. |
| Input pulse width | $T=4$ milliseconds. |
| Pulse repetition rate | 20 p.p.s. |
| Shift register size | $n=20$ bits. |
| Sampling frequency | 5 kc. |
| Noise bandwidth (6 db) | 20 c.p.s.–2.5 kc. |
| Sample interval duration | 3 microseconds. |
| Noise voltage | 0.2 volt R.M.S. |
| Threshold noise probability | $p_N=0.2$ |
| False alarm rate | Various values from 0.0078 to 0.0233. |
| Weighting | Uniform. |

Example IV

| | |
|---|---|
| Pulse signal waveform | Sawtooth. |
| Input pulse width | $T=1$ millisecond. |
| Pulse repetition rate | 20 p.p.s. |
| Shift register size | $n=5$ bits. |
| Sampling frequency | 5 kc. |
| Noise bandwidth (6 db) | 20 c.p.s.–2.5 kc. |
| Sample interval duration | 3 microseconds. |
| Noise voltage | 0.2 volt R.M.S. |
| Threshold noise probability | $p_N=0.2$. |
| False alarm rate | 0.012. |
| Weighting | Selective. |

Example V

| | |
|---|---|
| Pulse signal waveform | Sawtooth. |
| Input pulse width | $T=2$ milliseconds. |
| Pulse repetition rate | 20 p.p.s. |
| Shift register size | $n=10$ bits. |
| Sampling frequency | 5 kc. |
| Noise bandwidth (6 db) | 20 c.p.s.–2.5 kc. |
| Sample interval duration | 3 microseconds. |
| Noise voltage | 0.2 volt R.M.S. |
| Threshold noise probability | $p_N=0.2$. |
| False alarm rate | 0.002. |
| Weighting | Selective. |

In all of the above working examples, a passband for the noise of the indicated bandwidth was obtained by use of a Kron-Hite 310AB variable-bandpass electronic filter. Each of the above working examples yielded one or more measured detection probability values which were good approximations to those theoretically attainable.

The above disclosed embodiments of the invention being exemplary only, it is to be understood that additions thereto, modifications thereof, and omissions therefrom can be made without departing from the spirit of the invention, and that the invention comprehends embodiments differing in form/or detail from those specifically described. For example, while it is preferred to detect the probable presence of a pulse signal of non-rectangular waveform by the selective weighting technique disclosed herein, alternatively, the also-disclosed uniform weighting technique may be used. Further, the invention is applicable to systems wherein the $n$ samples are parallel (i.e., simultaneous) instead of being time-consecutive samples. Still further, the invention hereof in statistical decision techniques is broadly applicable to systems wherein it is required to distinguish a signal from noise on the basis of, say, phase or frequency instead of amplitude (e.g., frequency modulation systems).

Accordingly, the invention is not to be considered as limited save as is consonant with the recitals of the following claims.

We claim:

1. Apparatus comprising, input means for received electrical energy comprised of gaussian noise and of a received signal characterized by time variation in amplitude, clock-means definitive of periodic sampling intervals for said energy, source means of at least one threshold level for said energy, quantized sample generating means operable by sampling in said intervals the amplitude of said energy relative to said level to produce separate quantized sample indications of the respective amplitude values relative to said level and in said periodic intervals of said energy, said indications being of first and second different digital values when the amplitude of said energy in the corresponding intervals is, respectively, above and below said level, means providing an electrical condition to be statistically satisfied by collectively a plurality of said indications, and decision means responsive to statistical satisfaction of said condition by said plurality of indications collectively to produce an output representative of the probable presence of said received signal, the bandwidth of the apparatus for said indications being substantially one-half the sampling frequency.

2. Apparatus comprising, input means for received electrical energy comprised of gaussian noise and of a received signal characterized by time variation in amplitude, clock-means definitive of periodic sampling intervals for said energy, source means of at least one threshold level for said energy, quantized sample generating means operable by sampling in said intervals the amplitude of said energy relative to said level to produce separate quantized sample indications of the respective amplitude values relative to said level and in said periodic intervals of said energy, said indications being of first and second different digital values when the amplitude of said energy in the corresponding interval is, respectively, above and below said level, means providing an electrical condition to be statistically satisfied by collectively a plurality of said indications, and decision means responsive to statistical satisfaction of said condition by said plurality of indications collectively to produce an output representative of the probable presence of said received signal; the ratio of said level to the long term R.M.S. value of the noise in said energy being in the range from 0.5 to 1.9.

References Cited

UNITED STATES PATENTS

| | | | |
|---|---|---|---|
| 3,307,408 | 3/1967 | Thomas | 73—462 |
| 2,907,400 | 1959 | Swafford | 324—77 |
| 2,958,039 | 1960 | Anderson | 324—77 |
| 3,007,114 | 1961 | Pastoriza | 328—14 |
| 3,100,874 | 1963 | Soland | 328—165 |
| 3,114,884 | 1963 | Jakowatz | 328—165 |
| 3,214,700 | 1965 | Hook | 328—115 |
| 3,344,353 | 9/1967 | Wilcox | 328—151 |
| 3,348,031 | 10/1967 | Russell | 324—77 |

JOHN S. HEYMAN, Primary Examiner

H. A. DIXON, Assistant Examiner

U.S. Cl. X.R.

307—235; 328—165

PO-1050
(5/69)

UNITED STATES PATENT OFFICE
CERTIFICATE OF CORRECTION

Patent No. 3,493,874     Dated February 3, 1970

Inventor(s) Seymour I. Finkel, et al.

It is certified that error appears in the above-identified patent and that said Letters Patent are hereby corrected as shown below:

Column 2, line 42 "companator" should be -- comparator --; line 45, "the" third occurence, should be -- a --; line 47, "squal" should be -- equal --; Column 5, line 61, "Schimitt" should be -- Schmitt --; Column 7, line 33, after "detection" should be -- technique --; line 70, "system" should be -- systems --; Column 10, line 55, after "to" should be -- the --; Column 12, line 61, "Set on machine No. 47" is not in the specification; Column 14, line 66, "form/or" should be -- form and/or --; Column 15, line 20, "intervals" should be -- interval --.

SIGNED AND SEALED

JUL 14 1970

(SEAL)
Attest:

Edward M. Fletcher, Jr.
Attesting Officer

WILLIAM E. SCHUYLER, JR.
Commissioner of Patents